United States Patent Office 3,428,582
Patented Feb. 18, 1969

3,428,582
INTERPOLYMER AQUEOUS DISPERSIONS AND PAPER COATED THEREWITH
Oliver Des Deex, Clayton, Mo., assignor to Monsanto Company, St. Louis, Mo., a corporation of Delaware
No Drawing. Filed May 6, 1966, Ser. No. 548,064
U.S. Cl. 260—8                                9 Claims
Int. Cl. C09j 3/14; D21h 3/38, 3/82

ABSTRACT OF THE DISCLOSURE

Interpolymer latices, useful as pigment binders or adhesives in pigment coating compositions for paper, paper board and similar materials, selected from the group consisting of (a) an interpolymer containing about 15–70 percent ethylene, about 30–85 percent vinyl chloride and about 0.1–10 percent of at least one other polar monomer including at least 0.1–10 percent of acrylamide, and (b) interpolymers of the type described in (a) treated with an acid or base, said interpolymer latex being used either alone or in combination with paper coating starch or protein material.

---

This invention relates to aqueous interpolymer lactices and to the use of these latices as pigment binders or adhesives in pigment coating compositions for paper, paperboard, and similar materials. More particularly, this invention provides certain ethylene/vinyl chloride/polar monomer interpolymer latices as pigment binder components. In addition, this invention provides certain ethylene/vinyl chloride/acrylamide interpolymers and such interpolymers hydrolyzed with alkaline material or with an acid as new compositions of matter which find particular utility as adhesives or binders in pigment coating compositions for paper and paperboard.

Ethylene/vinyl chloride copolymer latices have been used as pigment binders or adhesives in pigment coating compositions. They have the advantage of providing coatings with good thermoplasticity, and good gloss ratings in standard tests, but they do not provide the desired level of "pick" resistance, that is, resistance of the coated paper or paperboard to the pull of tacky printing inks.

Efforts to improve the adhesive quality of ethylene/vinyl chloride polymer latices have been frustrating prior to this invention. For example, attempts to incorporate acrylic acid, methacrylic acid and alkali metal or ammonium salts directly into such ethylene/vinyl chloride polymers in the hopes of increasing the adhesive quality of the resulting latex fail. Not only did the acrylic acid and like monomers fail to react extensively, but, surprisingly, they stopped the polymerization reaction of ethylene and vinyl chloride, and thus their use resulted in poor latex polymers for pigment binder applications. Esters of acrylic acid and methacrylic acid such as methyl acrylate and methyl methacrylate react readily with the ethylene/vinyl chloride copolymer latices but such ester monomers do not impart sufficient adhesiveness, even after alkaline or acid treatment.

Briefly, it has been found according to this invention, that new interpolymer latices or water dispersed polymers of ethylene, vinyl chloride, and acrylamide, with or without small quantities of other monomers give dramatically improved adhesiveness or pick resistance to pigment coating compositions containing them when applied to paper or paperboard substrates. It has been found that the best results are obtained when the ethylene, vinyl chloride, and acrylamide containing interpolymer latex is treated with a strongly alkaline material such as an aqueous alkali metal hydroxide or with an acid to hydrolyze a portion of the amide groups in the polymer latex. The ethylene, vinyl chloride, acrylamide interpolymer may contain small amounts of other polar monomers. If the interpolymer does contain these additional monomers it may not be necessary to treat the interpolymer latex with a base or an acid to hydrolyze acrylamide groups. But the initial presence of acrylamide in the interpolymer has been found by this invention to be essential to the preparation of an ethylene and vinyl chloride based pigment binder latex polymers which provide the higher pick resistance to pigment coating compositions when coated on paper or paperboard and calendered in paper coating operations. The chemical form that the acrylamide moiety takes in the interpolymer in the pigment binder application may thus vary depending upon the presence of other monomers and the extent of acid or base post-polymerization treatment but at least some amide groups should be present in the interpolymer latex as it is used in pigment coating compositions.

The new interpolymers which are prepared and used according to this invention in aqueous dispersion or latex form generally contain from about 15 percent to about 70 percent ethylene, from about 30 to about 85 percent vinyl chloride and from about 0.1 to about 10 percent of acrylamide. Part of the acrylamide in the interpolymer may be replaced by polar monomers such as acrylonitrile, N - (lower alkyl)acrylamide and N - (lower alkyl)methacrylamide containing from 1 to 3 carbon atoms in said lower alkyl groups, acrylic acid, methacrylic acid, and alkali metal and ammonium salts of acrylic and methacrylamide, maleic acid, fumaric acid, half and complete alkali metal and ammonium salts of maleic and fumaric acid, aconitic acid, itaconic acid, citraconic acid, and alkali metal and ammonium salts thereof, acrylyl and methacrylyl esters of hydroxyalkanoic acids having from 2 to about 6 carbon atoms in the alkanoic acid moieties, acrylylamides and methacrylylamides of aminoalkanoic acids having from 2 to about 6 carbons in the aminoalkanoic acid, hydroxyethyl and hydroxypropyl esters of acrylic, methacrylic, maleic, and fumaric acids, vinyl esters of alkanoic acids having from 1 to 6 carbon atoms such as vinyl acetate, vinyl propionate, and lower alkyl (1 to 6 carbon atoms) sulfonic acid, phenylsulfonic acids, and alkylphenylsulfonic acids and acrylyl and methacrylyl esters of hydroxyalkylsulfonic acids having from 1 to 6 carbon atoms in said alkyl moieties and hydroxyalkylsulfonamides having from 1 to 6 carbon atoms in said hydroxyalkyl moieties. The acrylamide generally should constitute at least 50 percent by weight of the third or polar monomer of said interpolymer, and preferably constitutes at least about 80 percent of said polar monomer. Thus the interpolymers as prepared in aqueous dispersed form are at least terpolymers containing ethylene, vinyl chloride, and acrylamide, and may be a quaternary or higher polymers containing one or more of the above exemplified additional polar monomers in small quantities but generally such additional monomers will not be present in the interpolymer in quantities greater than about 2 percent by weight.

The invention is primarily directed to the production, modification of, and use of new ethylene, vinyl chloride, acrylamide terpolymers in pigment binding applications. These new terpolymers, surprisingly, are particularly amenable to hydrolytic modification by the use of small quantities of a strongly alkaline material such as an alkali metal hydroxide, or a quaternary ammonium hydroxide such as tetramethyl ammonium hydroxide, or by a strong acid such as the mineral acids, e.g., hydrochloric, sulfuric, phosphoric, nitric. The base or acid used preferably has an ionization constant higher than $10^{-4}$ at 25° C. It has been found according to this invention that these ethylene/vinyl chloride/acrylamide interpolymer dispersions when partially modified, preferably with an aqueous base, e.g., sodium hydroxide, are more effective as pigment binding latices, than are the unmodified interpolymers, althrough the unmodified interpolymers are included for use in this invention. The hydrolyzing treatment, performed with an acid or a base as described above, need not be performed to the same extent, especially if the interpolymer contains polar monomers in addition to the acrylamide. The aqueous dispersion or polymer latex of the ethylene, vinyl chloride, and acrylamide is generally treated with aqueous base or acid in an amount which is chemically equivalent to up to about 100 percent of the amide equivalent in the interpolymer. However, it is desirable to retain at least some free amide groups in the interpolymer to assist in obtaining water insolubility in the final coating. It is preferred that the interpolymer contain from about 15 percent to about 70 percent ethylene, 30 percent to about 85 percent vinyl chloride, and from about 1 percent to about 5 percent acrylamide. A specific example of choice, as presently understood, is a terpolymer containing from about 19 to 23 percent ethylene, about 74 to about 78 percent vinyl chloride, and from about 2 to about 4 percent acrylamide in aqueous dispersion treated with sodium hydroxide in an amount stoichiometrically equivalent to about 20 to about 100 percent of the amide group content of the terpolymer.

Specific examples of polar monomers which may be used, as described above, to replace part of the acrylamide in the polymers of this invention include acrylonitrile, N-methylacrylamide, N-ethylacrylamide, N-propylacrylamide, methacrylamide, N-methylmethacrylamide, N-ethylmethacrylamide, N-propylmethacrylamide, acrylic, methacrylic, maleic, fumaric, itaconic, aconitic, and citraconic acids and alkali metal and ammonium salts of such acids, preferably the sodium, potassium or ammonium salts, alkyl esters of such acids, e.g., methyl acrylate, ethyl acrylate, butyl acrylate, methyl methacrylate, butyl methacrylate, ethyl methacrylate, monoethyl maleate, dipropyl fumarate, acrylyl 3-hydroxypropionate, methacrylyl 4-hydroxybutanoate, N-acrylyl acetamide, N-methacrylyl hexamide, 2-hydroxyethyl and 2-hydroxypropyl esters of acrylic, methacrylic, maleic, fumaric, itaconic, aconitic, and citraconic acids, vinyl formate, vinyl acetate, vinyl hexanoate, vinyl and alkyl esters of propanesulfonic acid, vinyl phenylsulfonate, acrylyl and methacrylyl esters of 2-hydroxypropylsulfonic acid, and N-acrylyl and N-methacrylyl 2-hydroxypropanamides.

These ethylene, vinyl chloride, acrylamide interpolymers may be prepared by first mixing ethylene and vinyl chloride in an aqueous medium in the presence of any suitable anionic or nonionic emulsifier and any initiator capable of generating free radicals in the chemical mixture at the chosen reaction temperature and pressure. The acrylamide, preferably in aqueous solution either alone or mixed with the appropriate amounts of other polar monomers, is added to the polymerizing ethylene and vinyl chloride mixture gradually throughout the reaction. Since the acrylamide is very reactive, it cannot all be added at the start of the reaction. Since, in the final application of the latex, the surface of the polymer particles constitutes the locus of adhesion, it is preferable to delay the addition of the acrylamide until about 40 to 50 percent of the desired conversion of the ethylene and vinyl chloride has been reached. This produces a shell-core latex in which the polar monomer is concentrated in the outer layers.

A preferred process comprises mixing ethylene and vinyl chloride monomers in the presence of an alkaline buffered reduction-oxidation (redox) initiator-catalyst system, water, and from about 1 percent to about 8 percent by weight based upon the monomer feed, or from about 4 percent to about 7 percent based upon the polymer product of an anionic or nonionic emulsifying agent having an hydrophilic-lipophilic balance (HLB) value of from about 10 to about 40, and reacting the mixture at a temperature and pressure and for a time sufficient to cause polymerization between the ethylene and vinyl chloride, and then to introduce acrylamide, either alone, or mixed with other monomers in minor amounts in an appropriate diluent such as water into the pressurized polymerizing reaction mixture of the ethylene and vinyl chloride.

Any initiator-catalyst system capable of generating free radicals in an aqueous medium can be used in the production of these ethylene/vinyl chloride/acrylamide polymer latices. Preferred is a redox system more explicitly a reduction-oxidation system, which provides the initiation and catalysis for the ethylene/vinyl chloride/acrylamide terpolymerization. A suitable redox system used herein consists of an oxidizing agent, a reducing agent, a multivalent metal compound (complexed if necessary so as to remain in solution), and an alkaline buffer. Suitable oxidizing agents include hydrogen peroxide, the inorganic persulfates such as potassium peroxy-disulfate, sodium peroxydisulfate, and ammonium peroxy-disulfate, the organic hydroperoxides such as cumene hydroperoxide and tert-butylhydroperoxide, and the alkali metal and ammonium perborates. The amount of oxidizing agent which can be used ranges from about 0.01% to about 10% by weight, and preferably from about 0.1% to about 2% of the monomer feed.

The reducing agents of this system must be capable of reducing a multivalent metal ion from a higher to a lower oxidation state. Examples of reducing agents include sodium, potassium, and ammonium sulfites, thiosulfates, sulfoxylates, bisulfites, and hydrosulfites. A particularly preferred reducing agent for use herein is sodium formaldehyde sulfoxylate. The amount of reducing agent is dependent upon the amount of oxidizing agent employed. Generally, an amount of reducing agent molecularly equivalent to the amount of oxidizing agent is required. This rule is subject to variation depending upon the particular combination of individual reducing and oxidizing agents. For instance, in a potassium or ammonium peroxy-disulfate-sodium formaldehyde sulfoxylate system, it has been determined that only 0.7 equivalent of sulfoxylate per equivalent of peroxydisulfate is necessary. In such case, the concentration of sulfoxylate can range from 0.7 to 1.0 equivalent per equivalent of peroxydisulfate.

Inclusion of a multivalent metal compound into the peroxydisulfate-sulfoxylate and other related redox systems to faster polymerization rates and higher conversions than are obtained in the absence of the multivalent metal compound. If fast rates and high conversions can be sacrificed, the metal compound can be excluded from several redox systems. The multivalent metal compound as used in the redox system under discussion refers to metallic salts in which the metal ion is capable of existing in at least two different valence states. Examples of such compounds include water-soluble salts of iron, cobalt, nickel, copper, zinc, silver and gold. Frequently the metal is complexed with a sequestering agent to keep the metal ions in solution under the basic conditions employed. This is accomplished by addition of a chelating compound such as an alkali metal ethylenediaminetetraacetate to the aqueous solution. The metal salts added to the redox system contains the metallic ion in its higher oxidation state to prevent its immediate reaction with the oxidizing agent of the system. In a preferred embodiment, ferric nitrate is used in conjunction with sodium ethylenediaminetetracetate to provide a ferric ethylenediaminetetraacetic acid chelate complex for the redox system. The concentration of multivalent metal ranges from about 0.0001% to about 0.1% by weght, and preferably from about 0.001% to about 0.01%, of the monomer feed.

Water is a necessary component of the polymerization system. The amount of water can vary widely however, depending upon the solids content desired in the finished latex. The solids content is dependent upon the quantity of monomer feed introduced into the system and the percent conversion, which is in turn dependent upon several of the above-described variables. In preferred embodiments, formulations containing water from about 50% to about 300% of the monomer feed have been used.

The buffer used herein can be any water-soluble basic compound whose 0.1 molar solution has a pH from about 7 to about 12, preferably from 8 to about 10. Examples of compounds include borax, sodium carbonate, sodium bicarbonate, potassium tartrate, sodium citrate, and ammonium hydroxide. The amount of buffer required for the process utilized herein is that amount necessary to maintain the pH of the reaction mixture between 7 and 12, preferably around pH 8. In a preferred embodiment using equal quantities of ammonium hydroxide and sodium bicarbonate together with a potassium peroxydisulfate oxidizing agent, a suitable concentration of buffer is from about 0.01% to about 10% by weight, and preferably from about 0.5% to about 2.0%, of the monomer feed. If an oxidizing agent such as ammonium peroxydisulfate is used instead of the potassium salt, it will usually be necessary to increase the preferred concentration range of buffer to about 1% to 3% or more.

The emulsifying agent is an essential component of the polymerization process if the process is to be capable of producing a stable ethylene/vinyl chloride/acrylamide polymer latex having 35% or more dispersed solids. Acceptable for use herein are those nonionic surfactants having an HLB of from about 10 to about 17, and those anionics having an HLB of at least 10, preferably from about 17 to about 40. The term "HLB" is discussed in Griffin, Classification of Surface-Active Agents by HLB, J. Soc. Cosmetic Chemists, 1, No. 5, p. 311 to 326 (1949). Briefly the HLB value indicates the hydrophilic-lipophilic balance of an emulsifier. Most of the common emulsifiers lie in an HLB range of from 1 to 20 where a value of one indicates a high degree of oil solubility and a value of twenty indicates high water solubility. Examples of suitable nonionic emulsifiers include alkyl aryl polyether alcohols such as lauryl phenyl polyether ethanol, alkanol amine fatty condensates such as triethanolamine, coconut fatty acid ethanolamide, lauric acid propanolamide, fatty alcohol polyglycol ether, myristyl phenyl polyglycol ether, glycerol sorbitan laurate, polyoxyethylene sorbitol hezaoleate, polyoxyethylene sorbitol spataoleate, polyoxylene sorbitol oleate laurate, a blend of sorbitan monostearate and polyoxyethylene stearate, fatty ester of polyethylene glycol, glycolamido stearate, propylene glycol monostearate, alkylphenol polyglycol ethers containing from 2 to 40 moles of ethylene oxide per mole of ether, and alkanol polyglycol ethers containing from 2 to 40 moles of ethylene oxide per mole of ether, and alkanol polyglycol ethers containing from 2 to 40 moles of ethylene oxide per mole of ether. Suitable anionic emulsifying agents, which have an HLB value of at least 10, are sodium dodecylbenzenesulfonate, sodium decylbenzenesulfonate, ammonium laurylbenzenesulfonate, potassium stearylbenzenesulfonate, sodium stearylbenzenesulfonate, sodium stearylsulfate, potassium myristylnaphthalenesulfonate, potassium oleate, sodium laurate, ammonium dodecylphenoxypolyoxyethylene ethyl sulfate, sodium lauryl sulfate, nonylphenoxy acetic acid, sulfated cresylic acid, disodium - N - octadecylsulfosuccinamate, tetrasodium N-(1,2 - dicarboxyethyl) - N - octadecylsulfosuccinamate, diamyl ester of sodium sulfosuccinic acid, dihexyl ester of sodium sulfosuccinic acid, bis(tridecyl)ester of sodium sulfosuccinic acid, dioctyl sodium sulfosuccinate, sodium dodecyl diphenyl oxide disulfonate, benzene potassium sulfonate, sodium salt of a sulfonated naphthalene-formaldehyde condensate, sodium salt of polyethoxy alkyl phenol sulfonate, sodium oleyl methyl tartrate, and triethanolamine salt of polyethoxy alkyl phenol sulfonate.

The concentration of emulsifier is much more restrictive than suitable concentration ranges for the other components of the polymerization system under discussion. Depending upon the particular emulsifier and upon the electrolyte chosen for use therewith, the concentration can range from about 1% to about 9% by weight of the monomer feed. Preferred ranges vary depending upon the emulsifier, the rate of reaction, the percent conversion and ease of latex separation desired. A preferred concentration range for a polyoxyethylene tridecanol having 10 moles of ethylene oxide per mole of tridecanol is from about 2% to about 5% by weight of the monomer feed. Concentrations of less than 2% can be used but only at considerable sacrifice of stability; emulsifier concentrations of more than 5% can likewise be used if higher foaming can be tolerated. Concentration of emulsifier is even more restrictive when expressed as a percentage of the polymer solids formed during the reaction. A suitable range of emulsifier is from about 3% to about 8% by weight, preferably from about 4% to about 6% of the polymer product.

For anionic emulsifiers, a different concentration is required. A preferred concentration range for sodium lauryl sulfate is from 1–3% of the monomer feed. Also, with sodium lauryl sulfate, the emulsifier is preferably added gradually during the course of the polymerization. Typically, the reaction is started with 0.05–0.1% based on monomer feed of the emulsifier present and remaining material added at a rate such that the amount added is proportioned to the ⅔ power of the conversion. The particle size of the resulting latex will vary from 600 to 2000 A. and more depending upon the actual concentration of emulsifier chosen.

Reaction temperatures can vary from about $-10°$ to about 75° C., preferably from about 25° to 50° C., and more preferably, when used in conjunction with preferred components and pressures, from about 30 to 35° C. At polymerization temperatures below 25° C., it is advantageous to include a small quantity (about 10% of the water present) of a lower alkyl alcohol such as methanol or ethanol to prevent hydrate formation of the monomer feed.

Reaction pressures are superatmospheric and can vary from less than 500 to more than 35,000 p.s.i. A preferred range is from about 600 to about 10,000 p.s.i., particularly from about 750 to about 3,000 p.s.i. During polymerization with its consequent conversion of gaseous monomers to solid polymer latex particles, the pressure is maintained within the desired limits by injection of water of monomers, usually by injection of gaseous vinyl chloride and then by injecting the acrylamide after the desired amount of ethylene vinyl chloride copolymerization has occurred.

In the optimization of the latx preparation stirring rates are of significant importance. Too little stirring gives lower polymerization rates; too much results in partial coagulation of the latex solids. The proper stirring rate, is, of course, dependent upon the size and shape of the reaction vessel in relation to the size, shape and placement of the stirrer blades. Using a 3820 ml. vessel (approximately one gallon) autoclave with inside dimensions of 12″ x 5″ in diameter together with three 4-bladed turbines being 2″ long and 1″ wide and each turbine being spaced equidistantly from each other along the length of the reactor, we have found that a stirring rate of 400 to 800 r.p.m. is satisfactory for our purposes. One skilled in the art will be advised to vary or utilize this stirring rate depending upon the particular configuration of his apparatus.

Because of the different reactivity ratios of ethylene and vinyl chloride, monomeric vinyl chloride enters an ethylene/vinyl chloride copolymer at a faster rate than does ethylene. The proportions of monomers in the feed necessary to produce a polymer of a given composition will vary deepnding upon the temperature and pressure of reaction, the specific catalyst system employed, the pH of the reaction system, and other variables. At a pressure of 3,000 to 35,000 p.s.i., a temperature of 30 to 32° C., using a persulfate-ferrous iron-sulfoxylate catalyst initiator system buffered to a pH of 8 to 10, the following is a tabulation of some monomer feed ratios with corresponding polymer ratios.

| Percent Weight in Monomer Feed E/VCl | Will Produce | Percent Weight Ethylene/ Vinyl Chloride in Polymer Product |
|---|---|---|
| 60:40<br>70:30<br>80:20 | { Will Produce } | 25:75<br>30:70<br>40:60 |

When the polymerization reaction between the ethylene and vinyl chloride has proceeded to the desired extent, which is usually about 2 to 4 hours at a reaction temperature of about 25–35° C. and at a pressure of about 750 to about 3,000 p.s.i.g., the acrylamide in aqueous solution is pumped into the reaction mixture at a steady even rate until the polymerization reaction stops, as is indicated by a drop in pressure, or temperature. The feed streams are shut off from the reactor.

The resulting ethylene, vinyl chloride, acrylamide containing interpolymer latex may be removed directly from the reaction vessel after venting most of any unreacted gases in the vessel, or it may be post-stabilized by adding to the polymer latex any suitable emulsifier and then drained from the reaction vessel. The post-stabilizing emulsifier may be any anionic or nonionic emulsifier of the type described above. It may be used in amounts up to about 5 percent based on the weight of the total solids in the polymer latex. An example is add a few ml. of the aqueous 25 percent by weight sodium lauryl sulfate solution to give a total equivalent to about 1% of the total polymer solids. In addition, if desired, other chemical stabilizers such as polyvinyl alcohol may be added in small amounts, about 1 percent of total solids, if desired.

The ethylene, vinyl chloride, and acrylamine containing interpolymer latices thus obtained may be packaged, shipped, and used as such in pigment binding applications. However, it has been discovered according to this invention that the adhesive quality of the interpolymer latex is enhanced if the interpolymer latex is treated or mixed with a strongly alkaline material, or an acid if desired, and an amount stoichiometrically equivalent to up to about 100 percent of the amide group content of the interpolymer. It is preferred that an aqueous alkali metal hydroxide solution, such as sodium hydroxide, be used for this purpose although any equivalent base may be used. Such an alkaline material is also preferably added in amount stoichiometrically equivalent to about 20 percent to aobut 50 percent of the amide group content of the interpolymer.

Subsequently described in detail are coating compositions which are aqueous dispersions of mineral and binder. Separately described are paper coatings which are the dried, finished coatings of mineral adhered to the paper base.

The improved coating compositions of the present invention are in the form of aqueous dispersions comprising water, a finely divided paper coating pigment or mineral, and at least 4% by weight based upon said pigment of a polymeric binder, at least a portion of said binder being an ethylene/vinyl chloride/acrylamide interpolymer of the types described above. The coating compositions of this invention preferably contain from about 30 to about 75% dispersed solids although compositions outside this range can be used if convenience or ease of coating can be sacrificed.

The paper-coating mineral or the pigment is an important component of the coating compositions. The principal functions of the pigment are to fill in the irregularities of the paper surface, to produce an even and uniformly absorbent or adsorbent surface for printing and to improve the appearance of the coated sheet. A suitable pigment should have all or most of the following properties—good dispersibility in water, correct particle size distribution, high opacifying power, high brightness, low water absorption, nonabrasive qualities, chemical inertness, compatibility with other ingredients of the coating mixture, low adhesive requirements, and if colored, a high tinctorial power and color permanence. Suitable pigment materials include minerals such as clays such as kaolinite, illite, montmorillonite, and beidellite; and other materials such as titanium dioxide (e.g., either anastase or rutile form), kieselguhr, precipitated calcium carbonate, water-ground calcium carbonate, calcium sulfate, calcium sulfite, barium sulfate, blanc fixe, satin white, and zinc pigments, e.g. zinc oxide, zinc sulfide, and lithopone.

The quantity of pigment or mineral in the paper coating compositions of this invention can vary from about 25 to about 75% by weight of the total aqueous dispersion. Narrower preferred ranges will vary depending upon variations within the binder, upon the particular clay or pigment utilized, and upon the desired uses of the finished paper product. A preferred range for Georgia kaolinite is about 30 to about 50% by weight of the total dispersion.

In order to prepare a satisfactory coating mixture, it is necessary to break up aggregates of dry clay into smaller dispersed particles. This is conventionally achieved by adding water and a dispersing agent to the clay solids and agitating the mixture. The clay-water slurries can range from about 30% up to about 80% solids. Even higher solids contents of the suspensions can be achieved with the more effective dispersing agents. Suitable dispersing agents include sodium silicate, sodium tetraphosphate, tetrasodium pyrophosphate, sodium hexametaphosphate, alkali metal salts of aryl alkyl sulfonic acids, and alkaline casein. The quantity of dispersing agent used will vary depending upon the particular compound chosen, the amount of water in proportion to the clay, and the desired effectiveness of the dispersion. From 0.1 to 0.5% tetrasodium pyrophosphate based on the weight of clay gives an effective dispersion of Georgia kaolinite clay in a 50–50 clay-water slurry. Other concentrations of dispersing agents for other clay slurries can be readily determined. Aqueous clay dispersions can be prepared using heavy-duty mixers such as sigma-blade and doughtype mixers.

The novel pigment binder of the present invention is an ethylene/vinyl chloride/acrylamide interpolymer and these interpolymers modified with an acid or base. An ethylene/vinyl chloride/acrylamide terpolymer used alone is a satisfactory pigment binder based on performance characteristics of the coated paper. Cost requirements for most applications, however, dictate the inclusion of a less expensive binder such as various types of starch and starch products and protein materials along with the ethylene/vinyl chloride/acrylamide terpolymer latex formulation. Such a dilution, a common practice in the use of synthetic resinous pigment binders, provides a significant reduction in cost with only a slight reduction in properties of the coated paper. The ratios of starch or protein solids to ethylene/vinyl chloride/acrylamide polymer solids include, e.g., 95:5, 67:33, 60:40, 40:60, 20:80, 5:95, and 0:100. The choice of which ratio binder to use will depend upon the properties desired in the final product, the cost of the binder, and upon the particular ethylene/vinyl chloride/acrylamide polymer latex employed. The ethylene/vinyl chloride/acrylamide binder can of course be used in combination with other synthetic pigment binders in latex form, examples being styrene/butadiene copolymers and styrene/butadiene/itaconic acid terpolymers, and acrylic and methacrylic polymers, and various polymeric vinyl acetate materials, e.g., vinyl acetate/dibutyl maleate polymers.

These new ethylene, vinyl chloride, and acrylamide containing interpolymer latices, both as produced and as modified with a base or an acid, have good mechanical stabilities in that there is generally less than 0.1 gram of coagulum precipitated per thirty minute test period, according to the Maron Stability Test. They are good film forming latices and have better adhesion properties than the ethylene/vinyl chloride copolymer latices.

These stable ethylene/vinyl chloride/acrylamide interpolymers of this invention generally have particle sizes of emulsified interpolymer from about 500 to about 5,000 angstroms, preferably from about 1,000 to 2,000 angstroms. Latices containing solids within these particle size ranges are capable of acquiring the high stability and satisfactory film-forming properties desirable for pigment binder. Particle sizes of these ethylene, vinyl chloride, and acrylamide containing interpolymers in aqueous latices can fall outside of these ranges if the required Maron Stability of one gram or less can be achieved.

The following detailed examples illustrate the preparation and use of the three or more monomer component polymer latices of this invention. In the polymer preparation examples all of the polymerizations were done in a 3820 ml. pressure vessel (approximately 1 gallon) at 30° C. with a 600 r.p.m. rotary stirrer speed.

EXAMPLE 1

This example illustrates the preparation of a 21/76/3 ethylene/vinyl chloride/acrylamide terpolymer latex, and the post stabilization of such latex with an emulsifier.

Reaction vessel initial charge:                                     G.
- $K_2S_2O_8$ (KPS) _____ 11.0
- $NaHCO_3$ _____ 15.0
- $Fe(NO_3)_3 \cdot 9H_2O$ _____ 0.8
- Tetrasodium ethylenediaminetetraacetate
  ($Na_4EDTA$) _____ 1.5
- Na lauryl sulfate (SLS) _____ 1.2
- $H_2O$ to make 1700 ml.
- Vinyl chloride (VCl) _____ 450
- Ethylene (E) _____ 150

The above ingredient mixture was heated to 30° C. with stirring to give a reaction pressure of 850 p.s.i.g. The polymerization was started by adding a 1 M sodium formaldehyde sulfoxylate - $NaHSO_2 \cdot CH_2O \cdot 2H_2$(SFS)/1.5 M ammonium hydroxide ($NH_4OH$) solution to the mixture at a rate of 5.2 ml./hr. at the same time 18 ml./hr. of a 25 percent SLS solution was added and the pressure was kept constant by the addition of pure vinyl chloride as required. After three hours had elapsed, a 50 percent solution of acrylamide in water solution was added at 40 ml./hr. The reaction stopped after 5.5 hours and the feed streams were turned off. A total of 1330 g. of VCl, 95 ml. of the 50 percent acrylamide, 27 ml. of the 1 M SFS/1.5 M $NH_4OH$ solution, and 92 ml. of the 25 percent SLS solution had been added. The resulting polymer latex was vented out the bottom of the autoclave. A total of about 3500 g. of the ethylene/vinyl chloride/acrylamide polymer latex was obtained containing 47 percent total solids, and 1.5 percent sodium lauryl sulfate (based on the weight of the polymer). It had a pH of 7.7. The composition of the terpolymer was about 21/76/3 ethylene/vinyl chloride/acrylamide. After addition of 1.5 percent of sodium dodecyl benzene sulfonate or 3% tridecyloxy

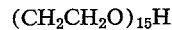
$(CH_2CH_2O)_{15}H$ the latex was ready for use directly as a pigment binder in standard clay coating formulations on paper and paperboard.

EXAMPLE 2

This example illustrates the preparation of the base-modified ethylene/vinyl chloride/acrylamide terpolymer.

Using the same reaction vessel and ingredients as are described in Example 1, except that only 10.0 g. of KPS, and only 0.5 g. of SLS was used in the initial ingredient charge. The SFS/$NH_4OH$ solution was added at the rate of 4 ml./hr. and the SLS solution was added at 8 ml./hr. The polymerization reaction stopped after 5.75 hours with a total of about 1340 g. of vinyl chloride, 100 ml. of acrylamide solution, 23 ml. of SFS/$NH_4OH$ solution. and 43 ml. of 25 percent SLS being added. The resulting terpolymer latex was post-stabilized by mixing therewith an additional 17 ml. of 25 percent sodium lauryl sulfate (SLS). The stabilized latex was then vented from the bottom of the reaction vessel. There was obtained 3460 g. of material containing 49 percent total solids, 1 percent of the SLS and essentially the same terpolymer as described in Example 1. The particle size of this polymer latex was somewhat larger than that of Example 1.

This stabilized ethylene/vinyl chloride/acrylamide terpolymer latex was warmed at 50° C. 4 to 16 hours after adding 0.4–2.0 g. of sodium hydroxide (added thereto as a 10 percent NaOH in water solution) per kilogram of latex.

EXAMPLE 3

A four monomer component polymer latex was prepared as follows:

A pressure reaction vessel was initially charged with
                                                                    G.
- KPS _____ 9.0
- $NaHCO_3$ _____ 12.0
- $Fe(NO_3) \cdot 9H_2O$ _____ 0.8
- $Na_4EDTA$ _____ 1.5
- SLS _____ 0.5
- $H_2O$ to make 1700 ml.
- E _____ 575
- VCl _____ 470

This mixture was sealed and warmed to 1,550 p.s.i.g. Polymerization was started by pumping into the vessel contents a 1 M SFS/1.5 M $NH_4OH$ solution at the rate of 4 ml./hr. At the same time 10 ml./hr. of a 25 percent SLS was added. Vinyl chloride sufficient to keep the pressure constant was added throughout the reaction. At the end of 3 hours of polymerization an aqueous solution containing 40 percent acrylamide and 10 percent sodium acrylate was added to the reactor at the rate of 24 ml./hr. After 6 hours, the reaction stopped and a total of 591 g. of vinyl chloride, 52 ml. of 25 percent SLS, 27 ml. of SFS/$NH_4OH$ and 72 ml. of the acrylamide/solution had been added. Unreacted ethylene and vinyl chloride were vented from the top of the reactor to lower the pressure to about 250 p.s.i.g., and then the latex was taken out through the bottom of the reactor. There was thus obtained about 3060 g. of latex containing 43 percent solids, and 1.1 percent sodium lauryl sulfate. The polymer composition was a 21/76/2.3/0.7 ethylene/vinyl chloride/acrylamide/sodium acrylate polymer. It was suitable for use directly as a binder in pigment coating compositions for paper and paperboard. The procedure is repeated substituting for the sodium acrylate an equivalent amount of sodium anethacrylate. An ethylene/vinyl chloride/acrylamide/sodium methacrylate of substantially the same monomer proportions is obtained.

EXAMPLE 4

The procedure of Example 3 is repeated substituting for the sodium acrylate an equivalent amount of hydroxyethyl acrylate to obtain as product a latex polymer of ethylene/vinyl chloride/acrylamide/hydroxyethyl acrylate in substantially the same proportions.

EXAMPLE 5

The procedure of Example 3 is repeated substituting for the sodium acrylate an equivalent amount of N-isopropyl acrylamide to obtain a latex ethylene/vinyl chloride/acrylamide/N-isopropylacrylamide polymer in substantially the same proportions.

EXAMPLE 6

The procedure of Example 3 is repeated substituting for the sodium acrylate an equivalent amount of N-ethylmetharcylamide to obtain a latex ethylene/vinyl chloride/acrylamide/N-ethylmethacrylamide polymer of substantially the same proportions.

EXAMPLE 7

The procedure of Example 3 is repeated substituting for the sodium acrylate a diammonium salt of itaconic acid to obtain a latex ethylene/vinyl chloride/acrylamide/diammonium itaconate polymer in substantially the same proportions.

EXAMPLE 8

The procedure of Example 3 is repeated substituting for the sodium acrylate an equivaelnt amount of the monobutyl acid maleate to obtain a latex ethylene/vinyl chloride/acrylamide/monobutyl acid maleate polymer having substantially the same proportions.

EXAMPLE 9

The procedure of Example 3 is repeated substituting for the sodium acrylate N-methacrylylpropionamide to obtain a latex ethylene/vinyl chloride/acrylamide/N-methacrylylpropionamide polymer having substantially the same proportions.

EXAMPLE 10

To 100 dry solids parts of an aqueous pigment slurry containing

| | Parts |
|---|---|
| Water | 40 |
| Georgia kaolin clay | 90 |
| Titanium dioxide | 10 |
| Sodium tetraphosphate | .25 | there was added 25 dry solids parts of the ethylene/vinyl chloride/arcylamide latex of Example 1. The total solids of the resulting pigment coating composition was adjusted to 50 percent solids and applied to cylinder paperboard (B) and bleached soild sulfate paperboard (SS), and to label paper sheets (P). The coated paperboard and paper sheets were then tested for resistance to the physical removal of coating during the commercial printing processes by the pick test. Pick resistance, that is, the ability of the coating to resist the pull of printing inks and remain adhered to the particular paper or paperboard base is measured by the I. G. T. Printability Test, a widely accepted standard test developed by the Institut voor Graphische Techniek in Amsterdam, Holland. In the I. G. T. test an ink of measured tackiness is applied uniformly to a standard diameter wheel. A strip of paper or paperboard containing the test coating is fastened to a spring loaded cylindrical segment of known diameter. The ink laden wheel is placed against one end of the strip of paper or paperboard at a pressure of 50 kg. pressure. The cylinder spring is released and the tacky ink is applied to the strip at an accelerated velocity of from 0 to 630 ft./min. as the strip passes through a given arc. If the coating on the paper is removed ("pick"), a break in the coating will be apparent at some point on the link printed coated test paper sample. This calibrated point is measured and reported as the velocity in feet per minute withstood by the coating before failure of the coating. The test is run on samples of the coated paper or paperboard with inks of increasing tackiness until the useful limits of the coated paper sample have been reached. A value of 630 feet per minute represents no failure of the coating in that particular tack graded ink. The next higher number inks are then used in sequence until failure does occur.

Using ink rated Number 3 in tackiness in a test involving the above pigment coating composition containing the test ethylene/vinyl chloride/acrylamide pigment binder on three types of cellulose substrate the results were as follows:

Table I

| Type of paper base: | I.G.T. rating, Ink No. 3 (ft./min.) |
|---|---|
| B | 370 |
| SS | 630 |
| P | 465 |

EXAMPLE 11

This example shows and compares the effectiveness of ethylene/vinyl chloride/acrylamide terpolymer (E/VCl/AA) latices as pigment binders when mixed with (a) converted corn starch, or (b) isolated soya protein. For this example the terpolymer constitutes 75 percent by weight of the pigment binder component and the starch (a) or the soya protein constitutes 25 percent by weight of the pigment binder; 25 parts/100 pigment total.

(a) In the 25%:75% starch-polymer latex example, the pigment binder mixture was added to the aqueous clay-titanium dioxide pigment suspension composition described in Example 10. The total starch-latex binder solids used amounted to 23 parts per 100 parts pigment. The pigment coating composition contained 45 percent solids and had viscosities of 460, 290, 172, and 128 centipoises at 10, 20, 50, and 100 r.p.m., respectively on a Brookfield RVT viscometer using a Number 2 spindle at 25° C. The results of the paper and paperboard coating pigment binder tests are summarized in Table II (a).

(b) In the 25:75 soya protein polymer latex example, the pigment binder mixture was added to the aqueous clay-titanium dioxide pigment suspension composition described in Example 10. The total binder solids used amounted to 18 parts per 100 parts pigment solids. The total pigment coating composition contained 45 percent solids and had viscosities of 120, 100, 80, and 90 centipoises at 10, 20, 50, and 100 r.p.m., respectively using a Brookfield RVT viscometer, Number 2 spindle at 25° C. The results of the paper and paperboard coating pigment binder tests on three different substrates are summarized in Table II (b).

TABLE II.—25:75 STARCH, E/VCL/AA PIGMENT BINDER

| Ink No.: | Paper Base | IGT Rating | Wet Rub Resistance | Gloss Before Calendering | Gloss After Calendering | Brightness After 2 Weeks |
|---|---|---|---|---|---|---|
| 3 | 1 B | 610 | 1-4 | 18 | 50 | 75 |
|   | 2 SS | 630 | 1-4 | 47 | 46 | 80 |
|   | 3 P | 560 | 1-5 |   | 38 | 78 |
| 5 | B | 270 |   |   |   |   |
|   | SS | 630 |   |   |   |   |
|   | P | 200 |   |   |   |   |

25:75 ALPHA-SOY PROTEIN, E/VCL/AA PIGMENT BINDER

| | Paper Base | IGT Rating | Wet Rub Resistance | Gloss Before Calendering | Gloss After Calendering | Brightness After 2 Weeks |
|---|---|---|---|---|---|---|
| 3 | B | 270 | 8-5 | 0 | 28 | 77 |
|   | SS | 630 | 1-5 | 4 | 34 | 81 |
|   | O | 400 | 1-5 |   | 43 | 80 |
| 5 | B | 150 |   |   |   |   |
|   | SS | 500 |   |   |   |   |
|   | O | 180 |   |   |   |   |

1 B is cylinder paperboard.
2 SS is bleached solid sulfate.
3 P is label paper.

EXAMPLE 12

This example illustrates the use of the alkali metal base modified ethylene/vinyl chloride/acrylamide terpolymer as a pigment binder in pigment coating compositions for use on paper and paperboard. The pigment binder tested in these formulations were 25:75 weight:weight mixtures of starch with ethylene/vinyl chloride/acrylamide terpolymer latices modified with about 50 percent, 20, or 10 percent of aqueous sodium hydroxide. Each polymer latex composition also contained 1 percent of polyvinyl alcohol. These test pigment binder mixtures were added to the aqueous clay-titanium dioxide pigment suspension composition described in Example 10. The binder solids content was 23 parts per 100 parts pigment solids. The total solids of the resulting pigment coating compositions were 45.5 percent, 46.3 percent and 46.5 percent for the 50 percent, 20 percent, and 10 percent sodium hydroxide treated latex samples, respectively. The pigment coating compositions were applied to three paper or paperboard substrates. The IGT ink resistance, wet rub, and ink gloss test results are summarized in the following table:

TABLE III

| Percent NaOH Treated | Ink No. | Paper Base | IGT Rating | Wet Rub Resistance | Ink Gloss |
|---|---|---|---|---|---|
| 50 | 3 | B | 630 | Excellent | Highest. |
|  |  | SS | 630 | do |  |
|  |  | P | 630 | do |  |
|  | 5 | B | 560 | do |  |
|  |  | SS | 630 | do |  |
|  |  | P | 290 |  |  |
| 20 | 3 | B | 630 | Excellent |  |
|  |  | SS | 630 | do |  |
|  |  | P | 630 | do | Highest. |
|  | 5 | B | 500 | do |  |
|  |  | SS | 630 | do |  |
|  |  | P | 280 | do |  |
| 10 | 3 | B | 630 | Excellent |  |
|  |  | SS | 630 | do |  |
|  |  | P | 630 | do | Highest. |
|  | 5 | B | 515 | do |  |
|  |  | SS | 630 | do |  |
|  |  | P | 290 | do |  |

EXAMPLE 13

For this example, 75% by solids weight of a 20 percent NaOH modified ethylene/vinyl chloride/acrylamide terpolymer latex was mixed with 25% by solids weight of an alpha-soy protein and of the resulting mixture, 18 parts was mixed with 100 parts solids aqueous clay-titanium dioxide pigment suspension described in Example 10, as the pigment binder therein. The resulting 45% solids pigment coating composition had the following viscosities at 25° C. using a Brookfield RVT viscometer with a Number 2 spindle, 25° C., at the indicated r.p.m.

R.p.m.: Viscosity (cp.)
10 ------------------------------------ 100
20 ------------------------------------ 80
50 ------------------------------------ 68
100 ----------------------------------- 72

The resistance of various paper and paperboard materials coated with this pigment coating composition using a Number 12 wire wound rod applicator was tested using Number 5 ink, by the IGT test method. The results are summarized in the following table.

TABLE IV

| Ink No. | Paper Base | Polymer latex type | IGT Rating (ft./min.) |
|---|---|---|---|
| 5 | B | E/VCl/AA, 20% NaOH | 200 |
|  | SS |  | 630 |
|  | M[1] |  | 600 |
|  | P |  | 100 |

[1] M means relatively low strength (Pick Resistance) bleached sulfate.

I claim:

1. A composition of matter comprising an aqueous dispersion of an interpolymer selected from the group consisting of (a) an interpolymer containing from about 15 to 70 percent ethylene, from about 30 to about 85 percent vinyl chloride, and from about 0.1 to about 10 percent of at least one other polar monomer including at least about 0.1 percent to about 10 percent of acrylamide, any remainder of said polar monomer content being selected from the group consisting of acrylonitrile, N-(alkyl)acrylamide, having from 1 to 3 carbon atoms in said alkyl groups, methacrylamide, N-(alkyl)methacrylamide, having from 1 to 3 carbon atoms in said alkyl groups, acrylic acid, methacrylic acid and alkali metal and ammonium salts of acrylic and methacrylic acid, maleic and fumaric acids, itaconic and citraconic acids, half alkyl esters of maleic, fumaric, itaconic, and citraconic acids having from 1 to 6 carbon atoms in said alkyl groups, acylyl and methacrylyl esters of hydroxyalkanoic acids having from 2 to 6 carbon atoms in said alkanoic acids, acrylylamide and methacrylylamides of aminoalkanoic acids having from 2 to 6 carbon atoms in said aminoalkanoic acid, hydroxyethyl and hydroxypropyl esters of acrylic, methacrylic, maleic, and fumaric acids, vinyl esters of alkanoic acids having from 1 to 6 carbon atoms and alkyl sulfonic acid having from 1 to 6 carbon atoms, phenylsulfonic acids, and acrylyl and methacrylyl esters of hydroxyalkylsulfonic acid having from 1 to 6 carbon atoms in said alkyl moieties, and hydroxyalkysulfonamides, having from 1 to 6 carbon atoms in said hydroxyalkyl moieties; and (b) interpolymers of the type described in (a) treated with an acid or a base having an ionization constant higher than about $10^{-4}$ in amounts equivalent to up to about 100 percent of the amide content of said interpolymer.

2. A composition of matter described in claim 1 wherein the interpolymer is a terpolymer containing from about 15 to 70 percent ethylene, from about 30 to 85 percent vinyl chloride and from about 0.1 to 10 percent acrylamide.

3. A composition of matter as described in claim 2 wherein the ethylene/vinyl chloride/acrylamide terpolymer s treated with alkaline material chemically equivalent to up to about 100 percent of the amide content of the interpolymer.

4. A composition of matter as described in claim 1 wherein the polar monomer content of said interpolymer is a mixture of a major amount of acrylamide and a minor amount, under 2 percent of the total interpolymer weight, of an alkali metal acrylate or methacrylate.

5. A composition of matter as described in claim 4 wherein the interpolymer is a quaternary polymer containing from about 15 to 70 percent ethylene, from about 30 to about 85 percent vinyl chloride, from about 1 percent to about 5 percent of acrylamide, and from about 0.1 to 2 percent of sodium acrylate or methacrylate.

6. A coated paper product comprising a paper base having on at least one surface of said paper base a coating comprising a finely divided pigment, and a pigment binder, said pigment binder comprising for each 100 parts by solids weight of the pigment, from about 5 to 30 parts by solids weight of the binder, which binder contains at least about 5 percent by weight of an ethylene/vinyl chloride/acrylamide interpolymer described in claim 1.

7. A coated paper product as described in claim 6 wherein the pigment binder is a mixture of (a) an interpolymer containing from about 15 to 50 percent ethylene, from about 30 percent to about 80 percent vinyl chloride, and from about 1 percent to about 5 percent acrylamide, dispersed in water and treated with an alkali metal hydroxide in an amount stoichiometrically equivalent to up to about 100 percent of the amide groups of said interploymers, and (a) a member of the group consisting of a paper coating starch and protein materials.

8. A coated paper product as described in claim 7 wherein the interpolymer (a) component of said pigment binder is a terpolymer containing about 19 to 23 percent ethylene, about 74 to 78 percent vinyl chloride, and from about 2 to 4 percent acrylamide in aqueous dispersion treated with sodium hydroxide in an amount stoichiometrically equivalent to about 10 to 100 percent of the amide group content of said terpolymer.

9. A method for producing a pigment coated paper product comprising coating at least one side of a paper product with an aqueous dispersion comprising water, a finely divided pigment, and from 5 percent to about 30 percent by weight of a pigment binder based on the weight of the pigment, at least 5 percent of which binder is an interpolymer containing ethylene, vinyl chloride, and acrylamide as described in claim 1, and then drying and calendering the coated paper product thus obtained.

References Cited

UNITED STATES PATENTS

| | | | |
|---|---|---|---|
| 2,914,498 | 11/1959 | Quarles et al. | 260—29.6 |
| 2,996,486 | 8/1961 | Martin | 260—29.6 |
| 3,111,505 | 11/1963 | Glabisch et al. | 260—29.6 |
| 3,297,618 | 1/1967 | Rust et al. | 260—87.5 |

WILLIAM H. SHORT, *Primary Examiner.*

E. M. WOODBURY, *Assistant Examiner.*

U.S. Cl. X.R.

260—17.4, 80.73, 41; 117—161, 155